(12) United States Patent
Norton (10) Patent No.: US 8,327,881 B2
(45) Date of Patent: Dec. 11, 2012

(54) DOUBLE SEAT VALVE APPARATUS (75) Inventor: Larry Norton, Elkhorn, WI (US)

(73) Assignee: SPX Corporation, Charlotte, NC (US)

( * ) Notice: Subject to any disclaimer, the term of this patent is extended or adjusted under 35 U.S.C. 154(b) by 534 days.

(21) Appl. No.: 12/234,234

(22) Filed: Sep. 19, 2008

(65) Prior Publication Data

US 2010/0072411 A1 Mar. 25, 2010

(51) Int. Cl.
*F16K 1/44* (2006.01)
*F16K 11/20* (2006.01)
(52) U.S. Cl. .............................. 137/614.18; 137/614.17
(58) Field of Classification Search ............. 137/614.18, 137/614.11, 1, 614.17, 312
See application file for complete search history.

(56) References Cited

U.S. PATENT DOCUMENTS

| | | |
|---|---|---|
| 4,360,039 A | 11/1982 | Jeppsson |
| 4,368,753 A | 1/1983 | Brakelmann et al. |
| 4,460,014 A | 7/1984 | Mases et al. |
| 4,552,167 A | 11/1985 | Brakelmann |
| 4,605,035 A | 8/1986 | Rasmussen et al. |
| 4,655,253 A | 4/1987 | Ourensma |
| 4,856,551 A | 8/1989 | Brakelmann |
| 5,048,555 A | 9/1991 | Mieth et al. |
| 5,645,102 A | 7/1997 | Brackelmann et al. |
| 5,699,825 A | 12/1997 | Norton |
| 5,732,727 A | 3/1998 | Mieth et al. |
| 5,904,173 A | 5/1999 | Ozawa |
| 6,089,255 A | 7/2000 | Bonnefous et al. |
| 6,098,645 A | 8/2000 | Brackelmann et al. |
| 6,178,986 B1 | 1/2001 | Burmester |
| 6,349,742 B1 | 2/2002 | Borg et al. |
| 6,490,738 B2 | 12/2002 | Blaney |
| 6,676,047 B1 | 1/2004 | Lindholm Jensen et al. |
| 6,862,789 B1 | 3/2005 | Hering et al. |
| 7,191,791 B2 | 3/2007 | Burmester |

(Continued)

FOREIGN PATENT DOCUMENTS

DE 19618235 C1 6/1997

(Continued)

OTHER PUBLICATIONS

Peschel. "Mix-Proof Valves: An Appraisal" Beverage World [Online] Jun. 1992, vol. 111, Iss. 1517, pp. 83.

*Primary Examiner* — Kevin Lee
(74) *Attorney, Agent, or Firm* — Baker & Hostetler LLP (57) ABSTRACT

A valve assembly has a valve body having an upper portion defining an upper chamber having an upper valve seat, and a lower portion defining a lower chamber having a lower valve seat, with an intermediate seat region between the upper valve seat and the lower valve seat. An upper valve stem is movable between a closed position seated against the upper valve seat and an open position spaced apart from the upper valve seat, and a lower valve stem is movable between a closed position seated against the lower valve seat and an open position spaced apart from the lower valve seat. A blocking ring is disposed in between the upper valve stem and the lower valve stem, and in contact with the intermediate valve seat. When the upper valve stem is open and the lower valve stem is closed, fluid escaping the upper chamber impinges on the blocking ring. When the upper valve stem is closed and the lower valve stem is open, fluid escaping the lower chamber impinges on the blocking ring.

20 Claims, 11 Drawing Sheets

U.S. PATENT DOCUMENTS

| | | | |
|---|---|---|---|
| 7,198,058 | B2 | 4/2007 | Burmester |
| 7,530,368 | B2 * | 5/2009 | Deger .................. 137/614.18 |
| 7,845,368 | B2 | 12/2010 | Burmester |
| 7,891,376 | B2 * | 2/2011 | Neuhauser et al. ...... 137/614.18 |
| 2007/0007483 | A1 | 1/2007 | Leblanc et al. |
| 2009/0065077 | A1 * | 3/2009 | Neuhauser et al. ...... 137/614.18 |

FOREIGN PATENT DOCUMENTS

| | | |
|---|---|---|
| DE | 19608792 A1 | 9/1997 |
| DE | 29714924 U1 | 10/1997 |
| DE | 19842603 A1 | 4/2000 |
| DE | 20019779 U1 | 4/2001 |
| DE | 20205467 U1 | 8/2002 |
| EP | 0545846 A1 | 6/1993 |
| EP | 1296087 A2 | 3/2003 |
| GB | 2064724 A | 6/1981 |
| JP | S57-154564 A | 9/1982 |
| JP | H10-132094 A | 5/1998 |
| JP | 2002-326067 A | 11/2002 |
| WO | 2005/093299 A1 | 10/2005 |
| WO | 2007/054131 A1 | 5/2007 |
| WO | 2007/054134 A1 | 5/2007 |

* cited by examiner

DOUBLE SEAT VALVE APPARATUS

FIELD OF THE INVENTION

The invention relates to the field of valves and more particularly to double seat valves with cleanable seats.

BACKGROUND OF THE INVENTION

Double seat block and bleed valves are in wide use in industry, for example in the food, dairy, beverage, pharmaceutical and biotechnology businesses. One example of such a double seat valve is a valve that is operated in connection with two flow conduit paths. In some applications, such as for example the industries mentioned above, it is desirable sometimes to interrupt the flow of the material and instead flush the system using a clean-in-place solution. One way this is sometimes accomplished is that the process material continues to flow through one conduit, while the clean-in-place solution flows through the other conduit.

In such systems, it is desirable that the process material be very well sealed and segregated from the clean-in-place solution so that the process material and the clean-in-place solution do not contact one another. In one example of such type of system, each conduit has a respective seat, and each conduit has a respective closing member or stem (usually as a reciprocating flanged valve stem), and the closing members can each be axially moved between a position sealing the seat and a position opening the seat. In the cleaning position, a valve associated with a respective conduit is opened when cleaning solution is in the conduit, and the cleaning solution is thus permitted to move from the conduit and exit through a drain. This cleaning process can occur while the other valve is closed, and process material is flowing through the other conduit.

A potential aspect of an arrangement having two seats and two closing members, is that when one of the valve seats is open (for example during a cleaning flush) there is only a single seal (typically an O-ring seal) that exists between the cleaning solution and the material. This seal may sometimes be subject to impingement of cleaning solution which is under a high velocity, particularly in designs where the cleaning valve is only opened by a small gap, and the clean-in-place solution squirts through the open gap at high velocity. It would be desirable in some applications and circumstances to avoid the effect of this impingement, at least to some extent.

SUMMARY OF THE INVENTION

Some embodiments of the invention relate to the field of valves and more particularly to double seat valves with cleanable seats.

One embodiment of the present invention is a valve assembly with a valve body comprising an upper portion defining an upper chamber having an upper valve seat, and a lower portion defining a lower chamber having a lower valve seat, with an intermediate seat region between the upper valve seat and the lower valve seat. The assembly has an upper valve stem movable between a closed position seated against the upper valve seat and an open position spaced apart from the upper valve seat, and a lower valve stem movable between a closed position seated against the lower valve seat and an open position spaced apart from the lower valve seat, with a blocking ring disposed in between the upper valve stem and the lower valve stem, and in contact with the intermediate valve seat, wherein (i) when the upper valve stem is open and the lower valve stem is closed, fluid escaping the upper chamber impinges on the lower blocking ring, and (ii) when the upper valve stem is closed and the lower valve stem is open, fluid escaping the lower chamber impinges on the blocking ring.

Another embodiment of the invention features a valve body comprising an upper portion defining an upper chamber having an upper valve seat, and a lower portion defining a lower chamber having a lower valve seat, with an intermediate seat region between the upper valve seat and the lower valve seat, an upper closing means movable between a closed position seated against the upper valve seat and an open position spaced apart from the upper valve seat, and a lower closing means movable between a closed position seated against the lower valve seat and an open position spaced apart from the lower valve seat. The valve assembly also contains a blocking means disposed in between the upper valve stem and the lower valve stem, and in contact with the intermediate valve seat, wherein (i) when the upper valve stem is open and the lower valve stem is closed, fluid escaping the upper chamber impinges on the blocking ring, and (ii) when the upper valve stem is closed and the lower valve stem is open, fluid escaping the lower chamber impinges on the blocking ring.

Yet another embodiment discloses a method of controlling fluid using a double block and bleed valve assembly having a valve body with an upper portion defining an upper chamber having an upper valve seat, and a lower portion defining a lower chamber having a lower valve seat, and with an intermediate seat region between the upper valve seat and the lower valve seat. The intermediate seat region performs at least one of the steps of moving an upper valve stem between a closed position seated against the upper valve seat and an open position spaced apart from the upper valve seat, moving a lower valve stem between a closed position seated against the lower valve seat and an open position spaced apart from the lower valve seat, and locating a blocking ring disposed in between the upper valve stem and the lower valve stem, and in contact with the intermediate valve seat, wherein when the upper valve stem is open and the lower valve stem is closed, fluid escaping the upper chamber impinges on the blocking ring, and wherein when the upper valve stem is closed and the lower valve stem is open, fluid escaping the lower chamber impinges on the blocking ring.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention relates to the field of valves and more particularly to double seat valves with cleanable seats. Various embodiments of the present invention provide for an advantageous dual seat valve, also referred to as a double block and bleed type valve, which prevents or substantially prevents mixing of materials in two different conduits, even when one of the conduits is being used for the clean-in-place operation and has a central opening to permit drainage of clean-in-place fluid. Some preferred embodiments will now be described with reference to the drawing figures, in which like reference numbers refer to like parts throughout.

Figure 1:
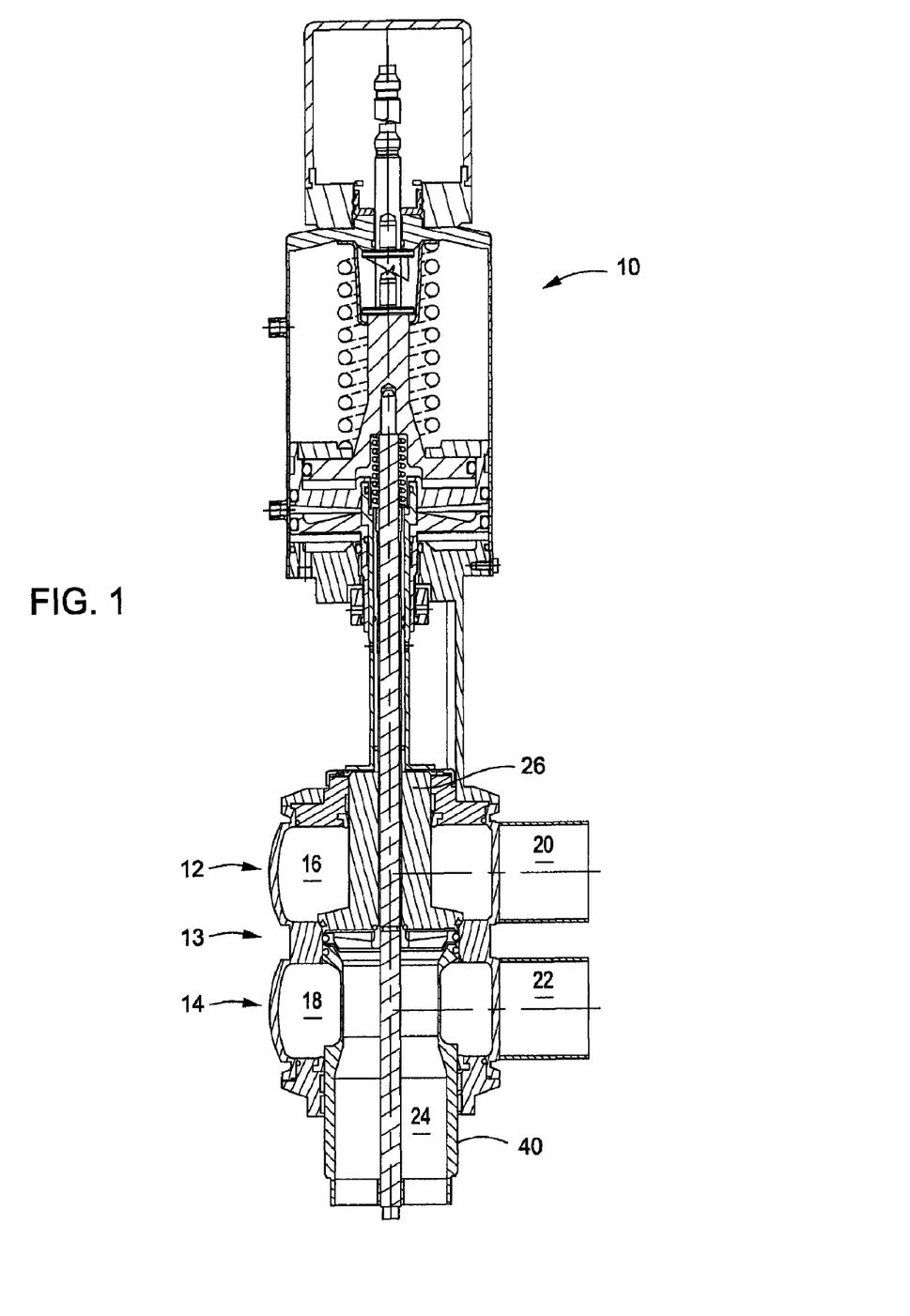
FIG. 1 is a diagrammatic view of a valve according to a first preferred embodiment of the invention.
Figure 2:
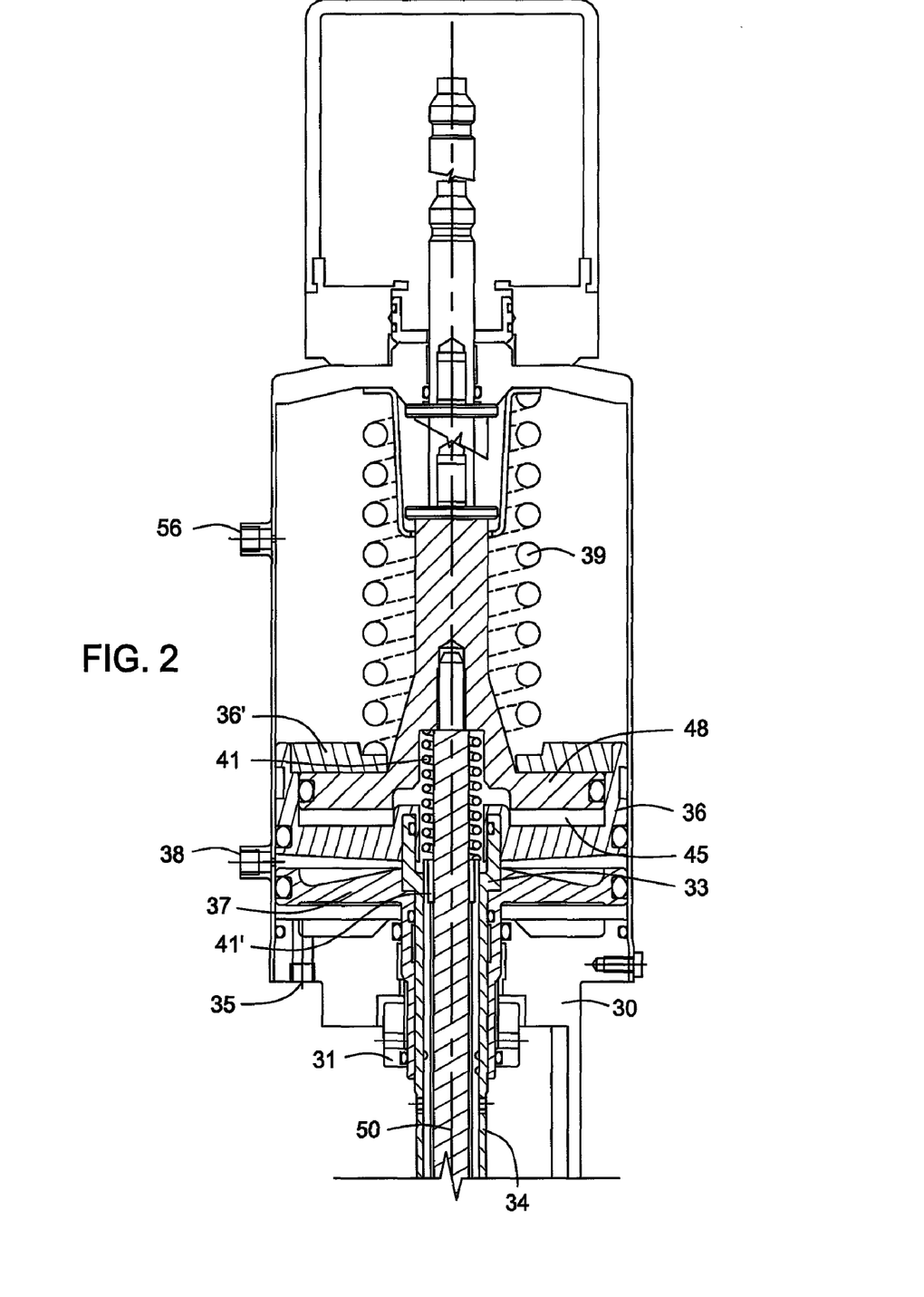
FIG. 2 is a cross-sectional partial view of a portion of the valve of FIG. 1.
Figure 3:
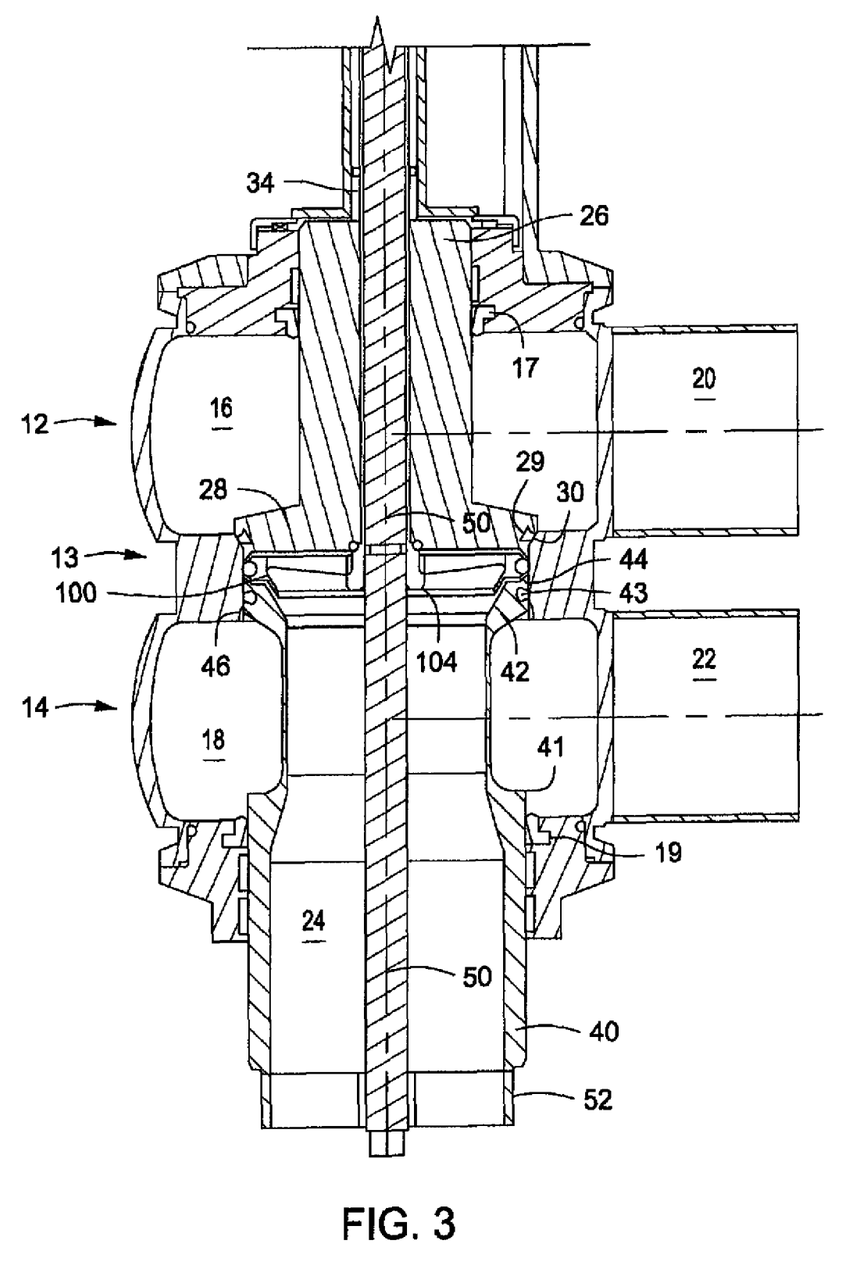
FIG. 3 is a cross-sectional partial view of the remaining portion of the valve in FIG. 1, not shown in FIG. 2.

Referring now to FIGS. 1-3, it will be appreciated that FIG. 1 is an overall schematic cross-sectional view of a double seat mix proof valve, with FIGS. 2 and 3 each being partial views at a larger scale of portions of the valve of FIG. 1. FIGS. 2 and 3 are provided to give a scale that permits placement of proper reference numerals.

Figure 7:
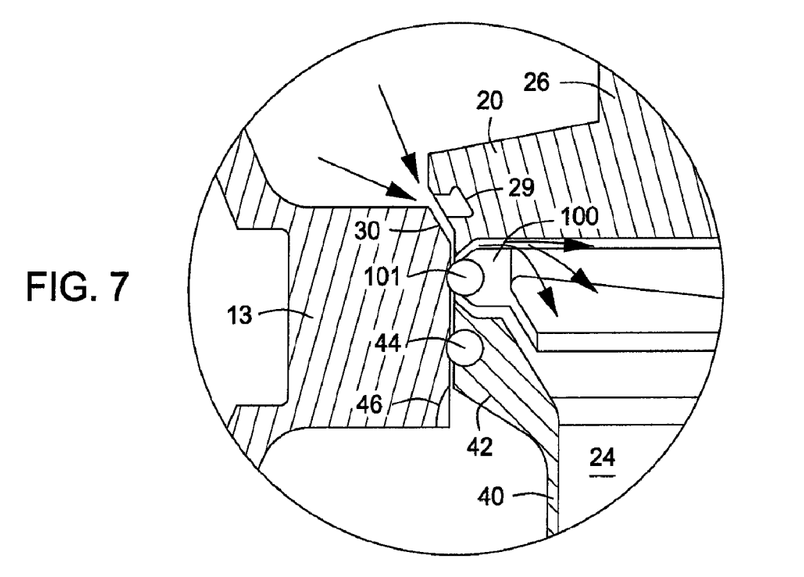
FIG. 7 is a view similar to FIG. 4, but showing the valve having the upper stem 26 lifted off the seat.

The illustrated valve 10, according to the preferred embodiment, includes two valve bodies 12 and 14. These valve bodies can be provided as a single unitary combined valve body which form both parts 12 and 14, with an intermediate body region 13. Together these valve bodies 12 and 14 and region 13 (which may be a unitary combined body) define an upper chamber 16 and a lower chamber 18. A center seat 15 is present on the inner diameter of region 13. The upper chamber 16 can be connected to an upper material conduit 20 and the lower chamber 18 can be connected to a lower material conduit 22. As will be discussed in more detail below, the valve 10 has a fully closed position (shown in FIG. 4) in which the upper chamber 16 and lower chamber 18 are completely separated from each other. The valve also has a position (shown in FIG. 9) where the valve is fully opened and thus material can move between the chambers 16 and 18, and thus material can flow from the conduit 20 to the conduit 22. Such an open position would be a typical operating position where material that is being pumped through the system, such as for example, food products or dairy products, is simply permitted to pass through the open valve. As will also be described in more detail below, the valve has an upper seat lift position (shown in FIG. 7) where an upper valve stem 26 is spaced from its respective seat and material can flow from the chamber 16 out through a lower end drain 24 of the valve. The valve 10 also has a lower seat lift position (shown in FIG. 8) in which a hollow lower valve stem 40 is spaced from its respective seat and material can flow from the conduit 18 out through the lower end drain 24.

Turning to FIG. 3, it will be appreciated that an upper valve stem 26 is provided. The upper valve stem 26 can be reciprocated in the axial direction from a closed position shown in FIGS. 1, 3 and 4-6, to the open position shown in FIG. 9. The upper valve stem 26 has an upper stem flange 28 which supports an O-ring 29. The O-ring 29 can seat against a conical upper seat 30 which is a beveled circumferential ring located on the intermediate body portion 13. The upper valve stem 26 is moved axially by an actuating tube 34 (also referred to as an actuating sleeve 34) which is connected to an adjusting collar 33 in the form of an increased diameter portion, which collar 33 in turn interacts a first piston 37 (also referred to as with an upper seat clean piston 37) and a second piston 36 (also referred to as a center piston 36).

Figure 11:
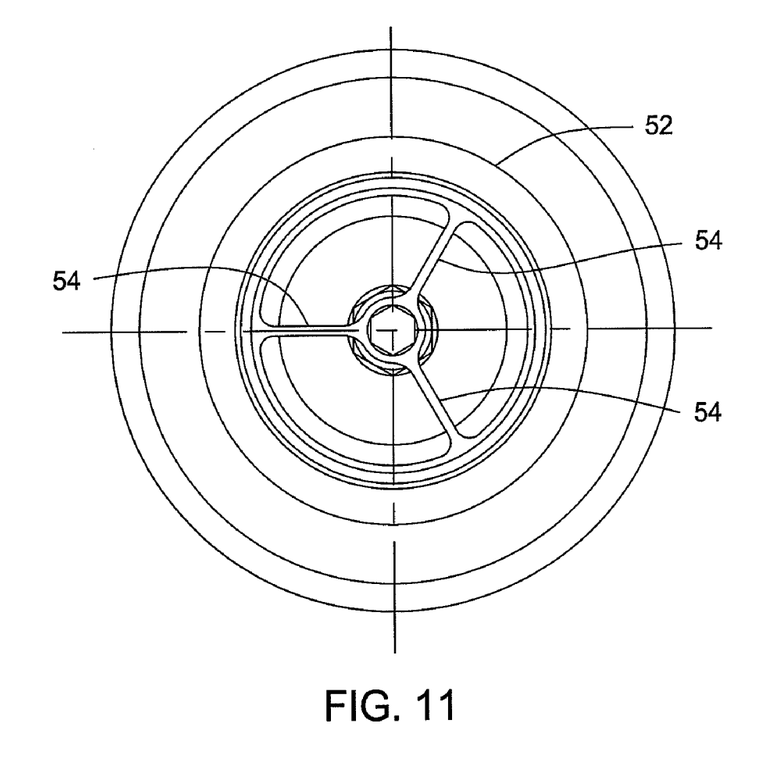
FIG. 11 is a bottom view of the valve of FIG. 1.

A lower valve stem 40 is provided which has a lower valve stem flange 42 supporting an O-ring 43. The lower valve stem 40 is hollow and its hollow center provides the drain 24. This O-ring 43 can seal against a lower seat 44 in the intermediate body region 13. The lower seat 44 is generally cylindrical but features around its periphery a number of cutout grooves 46 forming flow channels. The lower valve stem 40 has a closed seated position, as shown in FIGS. 1 and 4-7. An actuating rod 50 is connected to the lower valve stem 40 at a bottom end 52 of the lower valve stem 40. The bottom end 52 is an open three-arm spider ring having three arms 54 as shown in FIG. 11.

FIG. 2 illustrates an upper part of the system, including components that actuate or move the valve stems 26 and 40 as well as a blocking ring 100 (not shown in FIG. 2, but visible in other Figures). The lower end of FIG. 2 shows a rod 50. As seen in other Figures and described in more detail in other parts of this application, the rod 50 is ultimately connected to be able to move the lower valve stem 24. Movement of the rod 50 corresponds exactly into the same movement by the lower valve stem 24. A feature of some embodiments of the invention is the provision of a central blocking ring 100. The central blocking ring 100 is a spider ring having three central legs 102 (see FIG. 10) defining an otherwise open center area, as well as a central hub 104, which is bolted to upper stem 26 with axial movement. The blocking ring 100 supports around its periphery an O-ring 101. From FIGS. 4-9 it will be appreciated that the blocking ring 100 is essentially trapped between the upper valve stem 26 and the lower valve stem 40, but can "float" with play when there is a space between the stems 26, 40 that is greater than the thickness of the blocking ring 100. The O-ring 101 resists this float to some degree, but is overcome by stem movement. The blocking ring 100 is mounted by a shoulder bolt 104 to the upper stem 26, and has some ability to lie flush against the lower face of the upper stem 26 or to move axially a limited distance away from the upper stem 26. The upper valve stem 26 is free to slide axially over the rod 50; however, in the open position movement of the lower valve stem 24 causes axial movement of the upper valve stem 26 and blocking ring 100 by pushing on the ring 100. Also shown at the bottom of FIG. 2 is the actuating sleeve or tube 34 which is rigidly connected to the upper valve stem 26, so that movement of the sleeve 34 corresponds to the same axial movement by the upper stem 26.

A housing base 30 is provided. The housing base 30 provides a mounting point for some components that are described below. The rod 50 is threadably engaged with a thread piston 48 (also referred to as a lower seat clean piston 48). A main spring 39 biases the lower seat clean piston 48 downwards. The actuating sleeve 34 has an expanded diameter region or collar 33 that rests in an abutting relationship with center piston 36. Thus, any upward movement of the actuating sleeve 34 is restrained by the position of the center piston 36. Further, the center piston 36 has an upper disc portion 36'.

The main spring 39 abuts against the disc 36', and therefore the travel of the lower seat clean piston 48 is limited by the position of the disc 36'. The collar 33 of the sleeve 34 also has a lower shoulder which abuts with a face of the upper seat clean piston 37. Thus, downward movement of the sleeve 34 is limited by the position of the upper seat clean piston 37. Supply ports 35, 38 and 56 are provided and their operation will now be discussed below with reference to FIGS. 12-15.

The actuation of various components within the valve will now be described, in particular the valve closed position, the upper seat lift position (or upper seat clean position), the lower seat lift (or lower seat clean) position and the valve open position. These positions are particularly illustrated in FIGS. 12-15.

Figure 12:
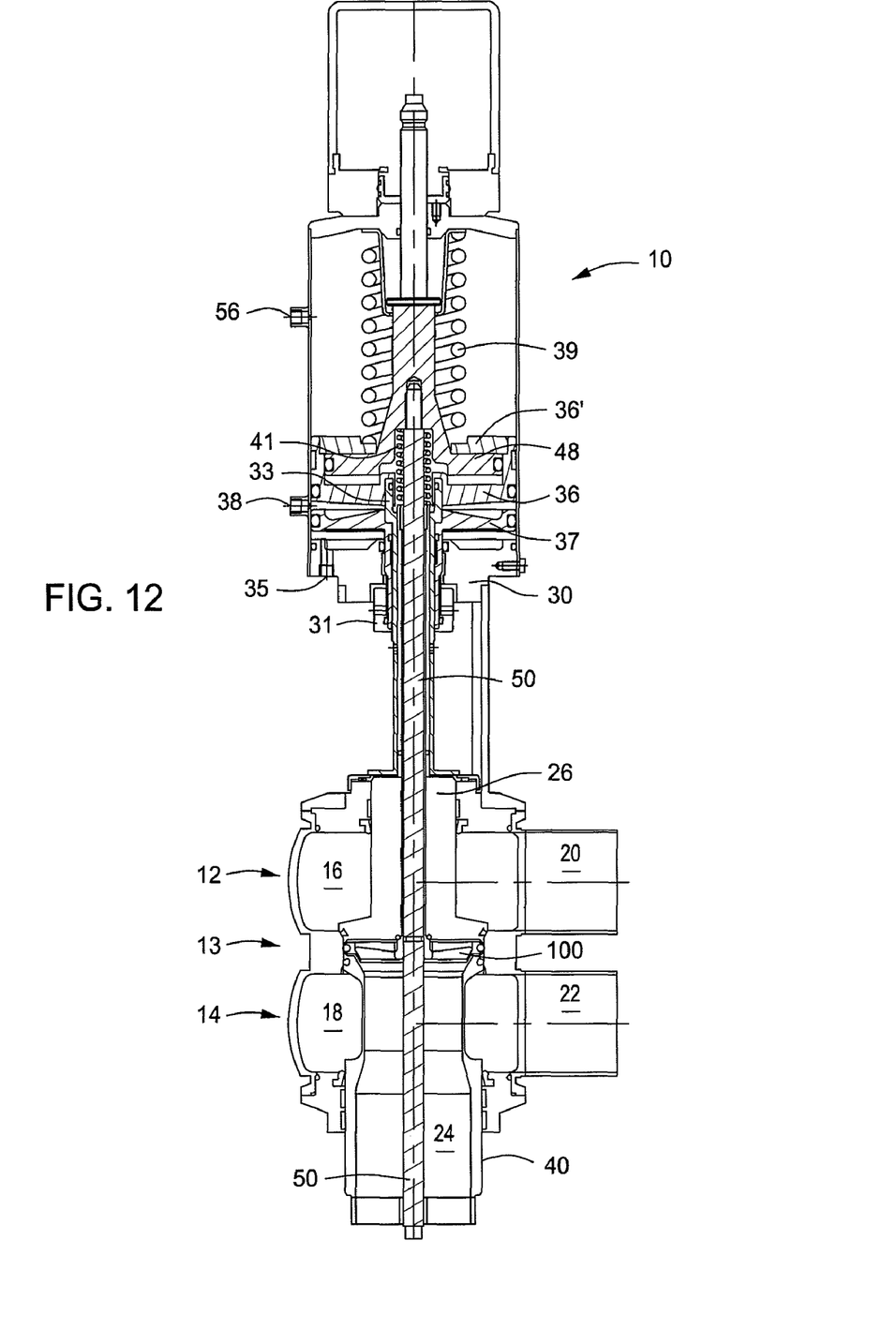
FIG. 12 is a view similar to FIG. 1, showing the valve in the completely closed position corresponding to FIG. 4.

FIG. 12 shows the valve assembly in a closed position. In this position, it is not necessary to supply any pneumatic pressure to any of the ports 35, 38 or 56. In this position, the spring 39 provides a downward biasing force on the disc 36'. A supplemental spring 41 is trapped between the lower seat clean piston 48 and the top of sleeve 34 which slides over the rod 50. A non-galling material 41' is provided. Therefore, the supplemental spring 41 provides a biased spring pressure tending to push apart the lower seat clean piston 48 from the collar 33, the sleeve 34, and the upper seat clean piston 37.

In FIG. 12 the upper disc 36' is biased downwards and by virtue of its shoulder connection with the valve open center piston 36, the piston 36 is biased downwards via the collar 33 until it pushes the upper seat clean piston 37 downward. The upper seat clean piston 37 is still spaced above the housing base 30 because the upper stem 26 is fully seated in a closed position so that no further downward travel is permitted. Further, because of the expansion force provided by the intermediate spring 41, the center piston 36 is spaced downwardly from the lower seat clean piston 48. Accordingly, it will be appreciated that in this closed position shown in FIG. 12, the force of the spring 39 is being applied to the disc 36' and thus to the center piston 36 and to the collar 33 and through the sleeve 34 to urge the upper stem 26 downward into a fully seated position. On the other hand, the force of the supplemental spring 41 is urging the lower seat clean piston 48 upwards flush against the disc 36, thereby locating the rod 50 so that the lower stem 24 is in a seated closed position also. The disc 100 is resting in between the valve stems 26 and 24 with some play in the free space between them.

Figure 13:
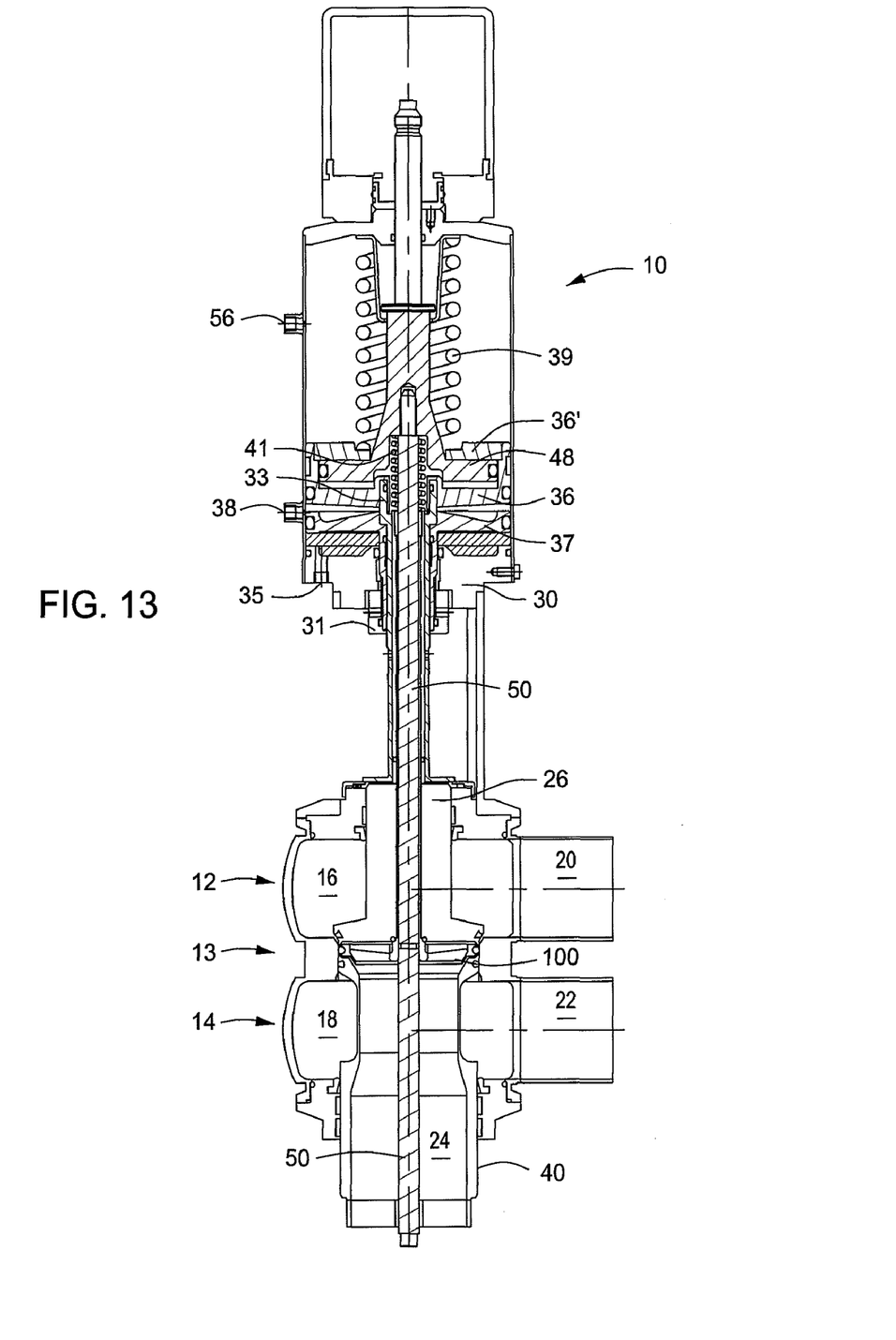
FIG. 13 is a view similar to FIG. 12, but showing the valve with the upper stem 26 lifted off the seat.

FIG. 13 illustrates an upper seat lift position. This position is essentially the same as that of FIG. 12, except that pressure is applied to port 35, causing the upper seat clean piston 37 to raise by a small amount. This raises the upper seat clean piston 37, and thus pushes upward on the collar 33, thereby raising the sleeve 34 and the upper stem 26 by a small amount. The raising of the collar 33 also raises the pistons 36 and 48, and therefore the lower stem and the blocking ring 100 move upward during the upper seat lift. The upper seat lift stroke length is relatively small and so the ring 100 and the lower stem 24 remain in sealed contact with seat 13. The upper seat lift travel is limited by a stop nut 31 that is mounted to the upper seat clean piston 37, as shown. In the upper seat cleaning position, the upward travel of the piston 37 is limited by contact of the stop nut 31 with a step surface on a recess in the housing base 30. Also, as shown in FIG. 3, the blocking ring 100 is actually free to slide over the shaft 50, but is mounted by a hollow shoulder bolt to the upper stem 26, with the shoulder bolt 104 providing some axial play. Therefore, the blocking ring 100 by virtue of its method of attachment to the upper stem 26 can either rest flush against the upper stem 26 or can be spaced away from the upper stem 26 by a small shoulder bolt 104 stroke range. Since the axial stroke range of the disc 100 relative to the upper stem 26 is smaller than the seat lift stroke, an initial part of the seat lift distance will be absorbed by the blocking ring being free to space apart from the upper valve stem 26, but as the upper valve stem 26 continues to move upwards by its upper seat lift stroke range, the shoulder bolt 104 will have reached its maximum range, and the continued upward seat lift motion of the upper stem 26 will pull the blocking ring 100 upwards in a wiping fashion, so that it is still sealed with the center seat 15, but wipes the seat 15 to some extent.

Turning to FIGS. 3 and 12, it will be appreciated that the blocking ring 100 is mounted to the upper valve stem 26, by a hollow shoulder bolt 104 that permits some axial movement of the blocking ring 100 relative to the upper stem 26. In this range, the blocking ring 100 can sit flush against the lower face of the upper valve stem 26, or by moving through its range can be spaced apart a small distance from that face. A rod passes through a central aperture of the shoulder bolt 104 and blocking ring 100. Therefore, the blocking ring 100 can still move relative to the upper stem 26, as described above, without interfering with the rod 50. The rod 50 terminates at welded connection with lower end 52 of the lower valve stem 40.

Figure 14:
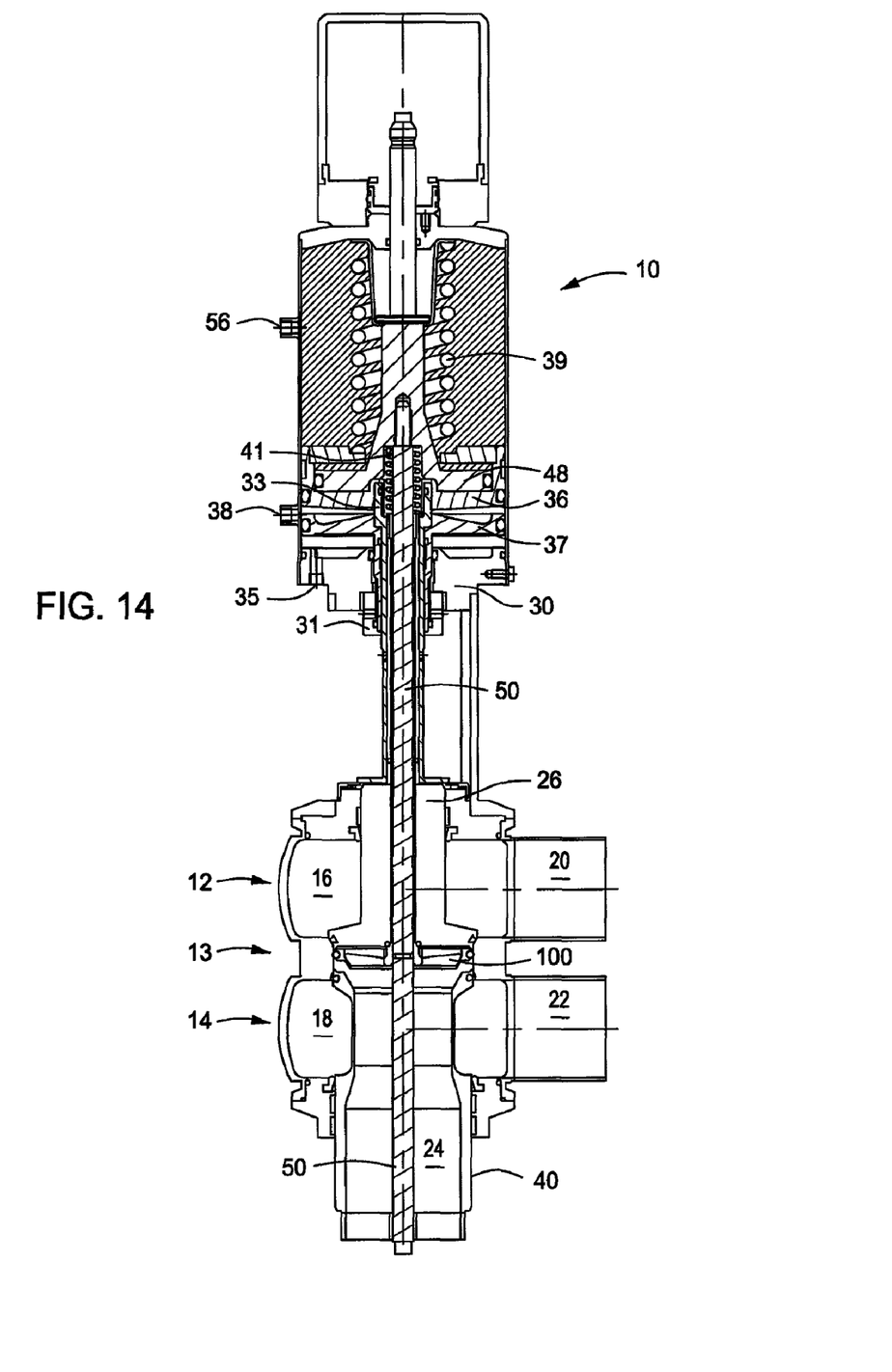
FIG. 14 is a view similar to FIG. 12, but showing the valve with the lower stem 40 lifted downward from the seat.

Turning to FIG. 14, a lower valve seat lift position is shown. In this position pressure has been applied to port 56, thereby urging the upper stem 26 into a fully closed position, and also overcoming the force of the supplemental spring 41 so that the lower seat lift piston 48, by a combination of force from the main spring 39 and the hydraulic force, is driven downwardly relative to the center disc 36, and abuts the center disc 36. In this position, it will be appreciated that since the lower seat clean piston 48 has been moved downwardly, to some degree, the rod 50 is also moved downwardly, and hence the lower valve stem 24 is moved downwardly by the same distance. Sine this movement is accomplished through the rod 50, the upper stem 26 remains seated, as in the closed position, and the blocking ring 100 will tend to rest in its most recent position, either slightly spaced from the upper stem 26, or slightly beneath it within the range permitted by the shoulder bolt 104. In this position, the lower valve stem 40 has been moved downwards by a distance sufficient so that its O-ring 43 is adjacent the grooves 46, and thus fluid from the chamber 18 can pass around the O-ring 43 and out through the hollow lower valve stem drain. In this position, fluid from the chamber 16 can bypass the O-ring 29, and flow through the open region of the blocking ring 100 and out through the hollow center 24 of the lower valve stem 40.

Figure 9:
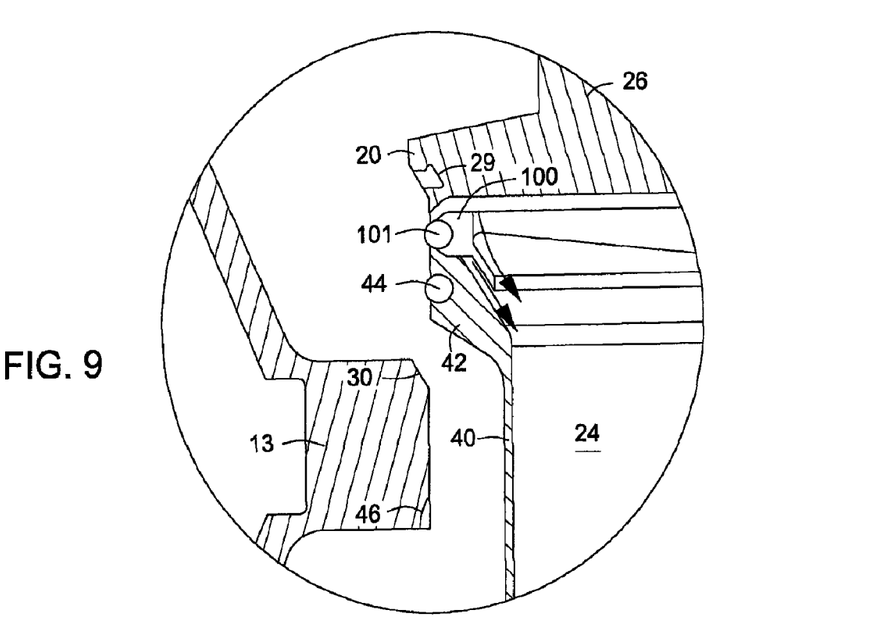
FIG. 9 is a view similar to FIG. 4, but showing the valve open with both the upper and lower stems 26, 40 raised off of the seats.
Figure 10:
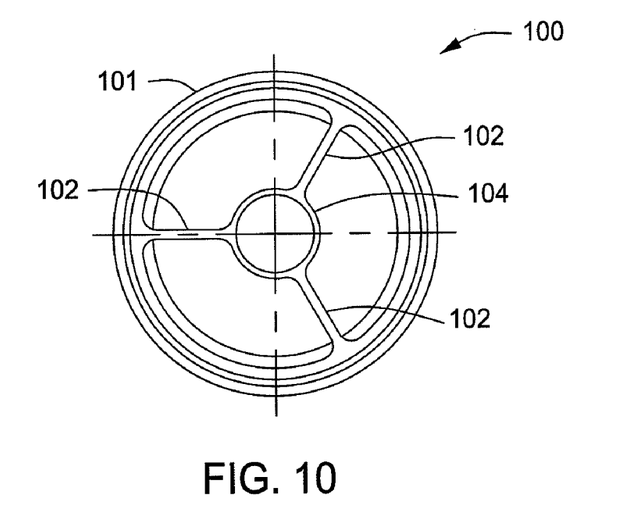
FIG. 10 is an end view of a blocking ring used in a preferred embodiment.
Figure 15:
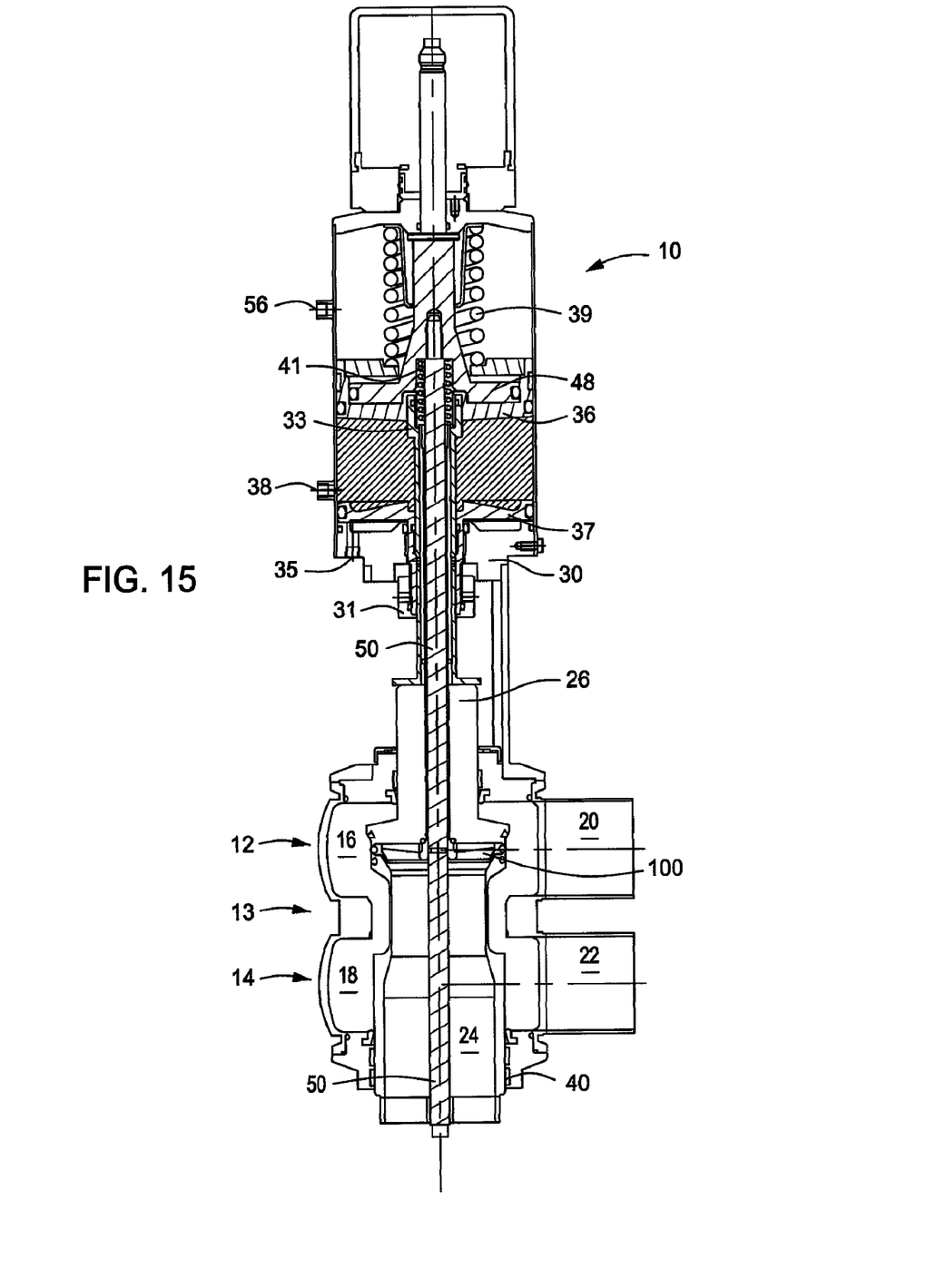
FIG. 15 is a view similar to FIG. 12, but showing the valve in an open position.

FIG. 15 illustrates an open valve position. In this position, pressure is applied to port 38, thereby urging the upper seat clean piston 37 into a fully downward position. However, this fully downward position of the upper seat clean piston 37 does not affect the operation of the device, because the remaining components travel upwards, as described below. The application of the pressure to port 38 urges the center piston 36 upwards. The center piston 36 pushes upwards on the lower seat clean piston 48 and compresses the spring 39 to retract the rod 50. Retracting the rod 50 upwards necessarily moves the lower valve stem 40 upwards. Thus, the lower valve stem 40 pushes upwards onto the blocking ring 100, and the blocking ring 100 is pushed upwards into facing contact with the bottom face of the upper stem 26. In this way, the upward movement of the seat clean piston 48 caused by the upward movement of the center piston 36 raises the lower valve stem 40 so that contacts with and pushes upwards on the blocking ring 100 and the upper valve stem 26. In this position, none of the O rings is seated with the seat face 15, and fluid can pass easily between chambers 16 and 18. However, because of the tight compression between the lower valve stem 40, the blocking ring 100, and the upper valve stem 26, and the shape of these items as shown in FIG. 9, the O-ring 101 associated with the blocking ring 100 actually has full sealing contact with the lowest outer corner of the upper valve stem 26 and the upper outer corner of the lower valve stem 40 so that the O-ring 101 a provides a complete seal between these three components 26, 40 and 100. Therefore, none of the material inside chamber 16 is able to pass into any gap between these three components 26, 40 and 100, and this material does not drain into the hollow drain area 24 of the lower stem 40. The arrows in FIG. 9 indicate where such drainage passage would occur, and if any such drainage is observed, this indicates that the O-ring 100 is leaking or damaged.

It will be appreciated that an upper seal 17 is provided to seal between the upper body 12 and the upper stem 26, and a lower seal 19 is provided to seal between the lower body 14 and the lower valve stem 40. The lower valve stem 40 may be provided with a plurality of cutouts 41 throughout its periphery, which during downward movement of the lower valve stem into the lower seat lift condition shown in FIG. 8, will permit some flow of fluid around the seal 19 to clean it.

Figure 4:
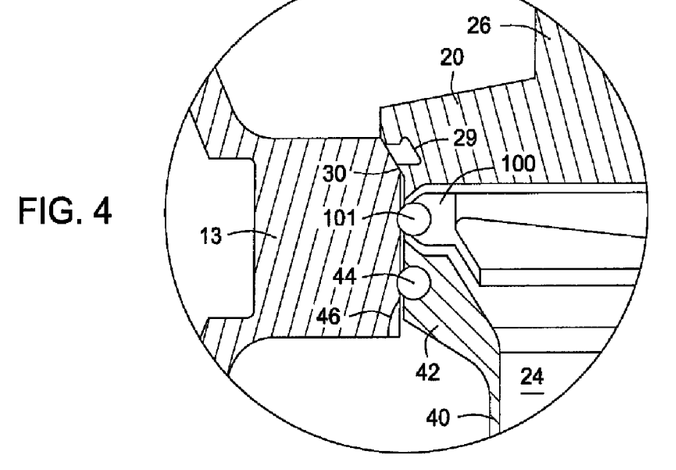
FIG. 4 is a detail view showing the valve in a completely closed position.
Figure 5:
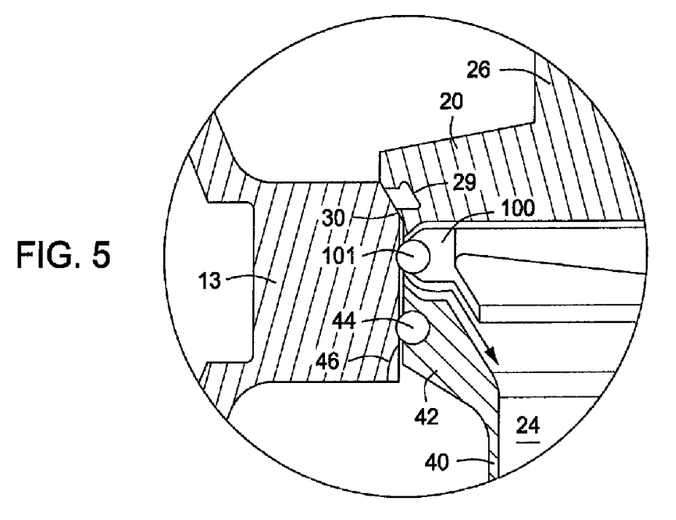
FIG. 5 is a view similar to FIG. 4, but showing a flow path with an arrow.
Figure 6:
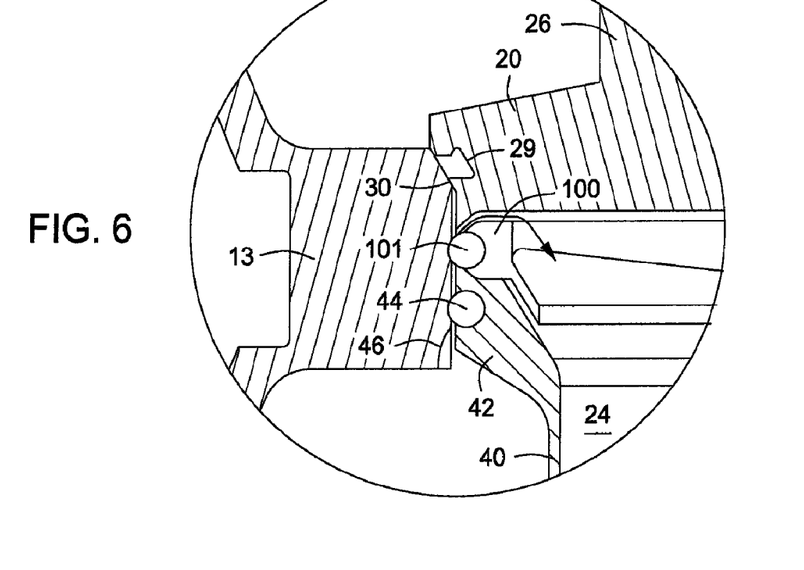
FIG. 6 is a view similar to FIG. 4, but showing a flow path with an arrow.

In FIGS. 1, 2, 3 and 4, the valve 10 is in a closed position, with the upper valve stem 26 in its lower most and closed position, and with the lower valve stem 40 in its uppermost closed position. In this condition, as shown in FIG. 4, the blocking ring 100 has some play or axial freedom of movement in between the upper valve stem 26 and the lower valve stem 40. As will be described in further detail with respect to FIGS. 5 and 6, depending on the most recent positional operation of the device, the blocking ring 100 may move up or down within its region of play. This provides a benefit in that the blocking ring 100 adopts different axial locations and thus provides some "wiping" of its area of contact with the intermediate portion 13, thus enhancing cleanability in that the blocking ring 100 since it does not tend to sit in one location where there could be material buildup.

As shown in FIG. 9, the valve 10 has an open position in which material is flowing from the conduit 20 into the conduit 22. This can be a normal operating condition during processing of the material. If it is desired to clean the valve 10, the following steps can be performed. First, the upper valve stem 26 is retracted upwards into the upper seat lift position shown in FIG. 7. In this upper seat lift position, the lower valve stem 40 remains as it was in the closed position, as does the blocking ring 100. However, due to the small incremental raising of the upper valve stem 26, the clean-in-place fluid flows through a gap between the upper seat 30 and the O-ring 29. This fluid flow is shown by the arrow in FIG. 7. The fluid may develop a relatively high velocity as it flows through this relatively small gap. However, it will impinge onto the blocking ring 100 and its O-ring 106. This provides a benefit in that the blocking ring 100 deflects the fluid upward and/or sideways as it follows the arrows shown, and then falls into the hollow center 24 of the lower valve stem 40 and drains out the bottom 52. A benefit of the provision of the blocking ring 100 is that the cleaning fluid passing through the small gap does not impinge directly onto the O-ring 43, and thus the risk of a breach at the O-ring 43 is reduced. It will be appreciated that during this operation, the chamber 16 and the upper valve stem 26, its seat 30 and the O-ring 29 can be cleaned while not interfering with any material in the lower chamber 18.

Figure 8:
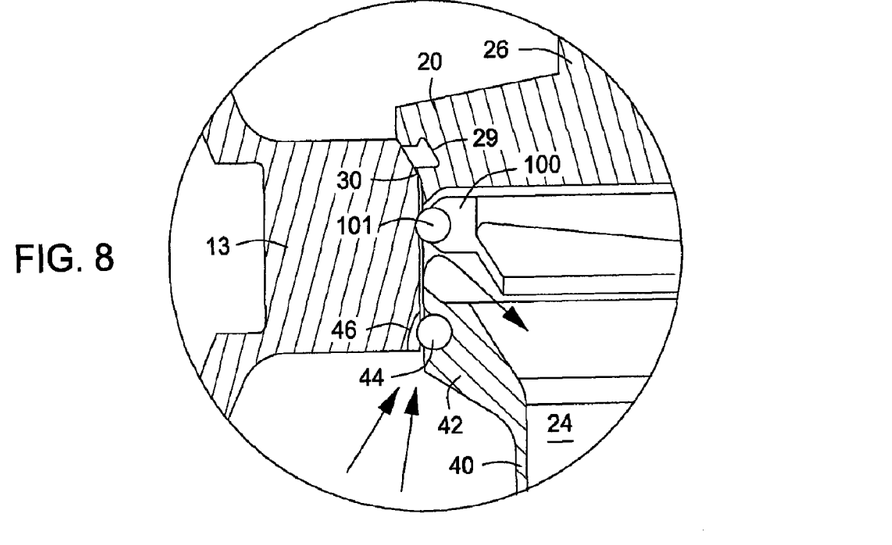
FIG. 8 is a view similar to FIG. 4, but showing the lower stem 40 lifted downward from the seat.

Another configuration is where the upper valve stem 26 remains in its closed position, but the lower valve stem 40 is moved downwardly to the lower seat lift position shown in FIG. 8. In this position, clean-in-place fluid can pass through the channels 46 and around the O-ring 43 as shown by the arrows in FIG. 8. This fluid impinges on the blocking ring 100 and is thus deflected so that it falls into the hollow portion of the lower valve stem 40 and drains out the open end 52. In this situation, also, the blocking ring 100 prevents direct impingement of a potentially high velocity fluid, such as cleaning fluid that is passing through the small gap, so that this fluid does not impinge at high velocity against the closed upper valve stem 26 and its O-ring 29. It will be appreciated that during the operation, the chamber 18 and the lower valve stem 40, the seat 44, channels 46 and O-ring 43 can be cleaned while not interfering with any material in the upper chamber 16. Also, the blocking ring 100 can have its open regions between the spider arms 102 sized to have the same open area as the open area between the spider arms 54 of the lower end 52 of the lower valve stem so that the provision of the blocking ring does not affect the drain volume area site (see FIGS. 10 and 11).

Finally, the valve 10 can be returned to the fully open position shown in FIG. 9. Thus, in both the upper seat lift position of FIG. 7 and the lower seat lift position of FIG. 8, the blocking ring 100 serves as a barrier to prevent direct impingement of high velocity fluid from one slightly opened valve stem onto the other closed valve stem. This enhances positive separation of the chambers 18 and 16 from each other during these conditions. It will further be appreciated that due to the floating nature of the blocking ring 100, it can vary between the position shown in FIG. 5 and the position shown in FIG. 6. That is, depending on the most recent actuation of the valve stems, the central ring 100 will wipe the adjacent surface of the intermediate portion 13.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A valve assembly, comprising:
    a valve body comprising an upper portion defining an upper chamber having an upper valve seat, and a lower portion defining a lower chamber having a lower valve seat, with an intermediate seat region between the upper valve seat and the lower valve seat;
    an upper valve stem having a flange of a larger diameter than the intermediate seat region to prevent the upper valve stem from descending below the upper valve seat movable between a closed position seated against the upper valve seat and an open position spaced apart from the upper valve seat;

a lower valve stem movable between a closed position seated against the lower valve seat and an open position spaced apart from the lower valve seat; and a blocking ring disposed in between the upper valve stem and the lower valve stem, and in contact with the intermediate valve seat, wherein (i) when the upper valve stem is open and the lower valve stem is closed, fluid escaping the upper chamber impinges on the blocking ring, and (ii) when the upper valve stem is closed and the lower valve stem is open, fluid escaping the lower chamber impinges on the blocking ring.

2. A valve assembly according to claim 1, wherein the upper valve stem has a first flange with an O-ring mounted to a periphery of the first flange.

3. A valve assembly according to claim 1, wherein the lower valve stem has a second flange with an O-ring mounted to a periphery of the second flange.

4. A valve assembly according to claim 1, wherein the blocking ring is a spider shaped ring having a central hub, a plurality of radial legs, and an outer peripheral ring.

5. A valve assembly according to claim 4, wherein the blocking ring further comprises an O-ring mounted to the peripheral ring thereof.

6. A valve assembly according to claim 1, wherein the blocking ring resides in a floating position in contact with the intermediate seat region in between the upper valve stem and the lower valve stem.

7. A valve assembly according to claim 1, wherein the valve assembly is a double block and bleed type valve.

8. A valve assembly according to claim 1, further comprising an actuating system connected to the upper valve stem and the lower valve stem to move the stems between their respective closed and opened positions.

9. A valve assembly according to claim 1, wherein the lower valve seat comprises a cylindrical region comprising a plurality of axial grooves.

10. A valve assembly according to claim 1, wherein the upper valve seat has a conical profile.

11. A valve assembly, comprising:

a valve body comprising an upper portion defining an upper chamber having an upper valve seat, and a lower portion defining a lower chamber having a lower valve seat, with an intermediate seat region between the upper valve seat and the lower valve seat the upper closing means including a flange having a diameter larger than the diameter of the intermediate region;

an upper closing means movable between a closed position seated against the upper valve seat and an open position spaced apart from the upper valve seat;

a lower closing means movable between a closed position seated against the lower valve seat and an open position spaced apart from the lower valve seat; and a blocking means disposed in between the upper valve stem and the lower valve stem, and in contact with the intermediate valve seat, wherein (i) when the upper valve stem is open and the lower valve stem is closed, fluid escaping the upper chamber impinges on the lower blocking ring, and (ii) when the upper valve stem is closed and the lower valve stem is open, fluid escaping the lower chamber impinges on the blocking ring.

12. A valve assembly according to claim 11, wherein the upper closing means stem has a first flange with an O-ring mounted to a periphery of the first flange.

13. A valve assembly according to claim 11, wherein the lower closing means stem has a second flange with an O-ring mounted to a periphery of the second flange.

14. A valve assembly according to claim 11, wherein the blocking means is a spider shaped ring having a central hub, a plurality of radial legs, and an outer peripheral ring.

15. A valve assembly according to claim 14, wherein the blocking means further comprises an O-ring mounted to the peripheral ring thereof.

16. A valve assembly according to claim 11, wherein the blocking ring resides in a floating position in contact with the intermediate seat region in between the upper closing means stem and the lower closing means stem.

17. A valve assembly according to claim 11, wherein the valve assembly is a double block and bleed type valve.

18. A valve assembly according to claim 11, further comprising an actuating means connected to the upper valve stem and the lower valve stem to move the upper closing means and lower closing means between their respective closed and opened positions.

19. A valve assembly according to claim 11, wherein the lower valve seat comprises a cylindrical region comprising a plurality of axial grooves.

20. A valve assembly according to claim 11, wherein the upper closing means has a conical profile.

* * * * *